(12) United States Patent
Kusic

(10) Patent No.: US 6,598,827 B2
(45) Date of Patent: Jul. 29, 2003

(54) TELESCOPIC VERTICAL TAKE-OFF AIRCRAFT

(76) Inventor: Tom Kusic, GPO Box 932, Melbourne, Vic. (AU), 3001

( * ) Notice: Subject to any disclaimer, the term of this patent is extended or adjusted under 35 U.S.C. 154(b) by 0 days.

(21) Appl. No.: 10/265,378

(22) Filed: Oct. 7, 2002

(65) Prior Publication Data

US 2003/0029965 A1 Feb. 13, 2003

Related U.S. Application Data

(62) Division of application No. 09/180,925, filed on Nov. 16, 1998.

(51) Int. Cl.$^7$ .............................................. B64C 27/06
(52) U.S. Cl. .................................. 244/17.11; 244/17.27
(58) Field of Search ............................. 244/17.27, 4 A, 244/17.25, 17.11, 8, 17.19, 7 R, 7 A; 416/148

(56) References Cited

U.S. PATENT DOCUMENTS

| 1,371,493 A | * | 3/1921 | Kugler |
| 2,378,617 A | | 6/1945 | Burke |

(List continued on next page.)

FOREIGN PATENT DOCUMENTS

| AU | 675906 | | 5/1996 | | |
| DE | 2214890 | * | 10/1973 | ............. | 244/17.11 |
| DE | 19540272 A1 | | 4/1997 | | |
| IT | 347533 | * | 4/1937 | ................... | 244/6 |
| WO | WO 84/00339 | | 2/1984 | | |
| WO | WO 85/03052 | | 7/1985 | | |

OTHER PUBLICATIONS

Letter Dated Sep. 16, 1998, by Mr. Trevor Ralston of Denel Aviation. Copy of Letter Attached.

(List continued on next page.)

*Primary Examiner*—Tien Dinh

(57) ABSTRACT

A telescopic vertical take-off aircraft is disclosed. The aircraft comprises a main rotor assembly 2 at the top of the aircraft which consists of an assembly of blades 3a, 3b and a rotor 4. Rotation of the main rotor assembly 2 is achieved by means of a main engine assembly 5. The main engine assembly 5 is connected to the main body 6 of the aircraft by a tilt enabling joint 7. The tilt enabling joint 7 enables tilting of the main engine assembly 5 relative to the main body 6 of the aircraft to occur in a controlled manner during flight. A universal joint 8 is used to allow tilting to occur. The tilt enabling joint 7 is fitted with hydraulic actuators 9, 10 and 11, that allow the tilting of the tilt enabling joint 7 to be controlled. When the main engine assembly 5 is tilted, the main rotor assembly 2 is tilted with it. Tilting of the main engine assembly 5 thus initiates changes in the direction of travel of the aircraft without the need to change the pitch angles of the rotor blades 3a and 3b. To counter the rotational force exerted on the main body 6 of the aircraft by the rotation of the main rotor assembly 2, an additional engine assembly 15 is attached to the main body of the aircraft, which rotates a secondary rotor assembly 16. The secondary rotor assembly consists of blades 17 and 18, and a rotor 19. Rotation of the secondary rotor assembly pushes air in a primarliy horizontal direction by way of the pitch of the blades 17 and 18. Telescopic tube assemblies 12 and 13 allow the distance between the base 14b of the tilt enabling 7 and the main body 6 of the aircraft to be varied.

23 Claims, 14 Drawing Sheets

U.S. PATENT DOCUMENTS

| | | |
|---|---|---|
| 2,569,882 A | 10/1951 | Bothezat |
| 2,589,030 A | 3/1952 | Alde |
| 2,677,431 A | 5/1954 | Prince |
| 2,724,446 A | 11/1955 | Hill |
| 2,818,122 A | 12/1957 | Johnston |
| 2,861,641 A | 11/1958 | Bensen |
| 3,010,678 A * | 11/1961 | Gose |
| 3,100,610 A | 8/1963 | Armstrong |
| 3,135,481 A | 6/1964 | Sudrow |
| 3,428,271 A | 2/1969 | Hollrock et al. |
| 3,474,987 A | 10/1969 | Meditz |
| 3,554,467 A | 1/1971 | Yowell |
| 3,647,315 A * | 3/1972 | Rostad et al. |
| 3,921,939 A | 11/1975 | Garfinkle |
| 3,986,686 A * | 10/1976 | Girard |
| 4,720,059 A | 1/1988 | Stearns |
| 5,996,933 A * | 12/1999 | Schier |
| 6,347,764 B1 * | 2/2002 | Brandon et al. |

OTHER PUBLICATIONS

Book: Aerodynamics of the Helicopter, by Alfred Gessow and Garry C. Myers, Jr, Published by: the Macmillan Company, New York, 1952.

* cited by examiner

TELESCOPIC VERTICAL TAKE-OFF AIRCRAFT

This is a divisional patent application, being a division of the U.S. patent application Ser. No. 09/180,925 filed Nov. 16, 1998.

FIELD OF THE INVENTION

This invention relates to the vertical take-off field of aviation.

BACKGROUND OF THE INVENTION

There are many helicopters and gyrocopters in existence today. However, helicopters rely on variable pitch rotor blades to maintain control and provide vertical lift, while aircraft commonly referred to as gyrocopters are pushed in a forward direction on take-off due to the backward thrust of air caused by the propeller located to the rear of the engine assembly. The present invention discloses a form of vertical take-off aircraft that achieves vertical take-off by means of rotating blades, but does not require the pitches of rotor blades to be varied to maintain control, and provides a means for varying the distance between the main lifting rotor and the main body of the aircraft.

SUMMARY OF THE INVENTION

The present invention discloses a vertical take-off aircraft that overcomes the need for varying the pitch of rotor blades while at the same time allowing vertical lift on take-off and directional control by providing a vertical take-off aircraft using an main rotor assembly at the top of the aircraft, which main rotor assembly consists of an assembly of blades and a rotor.

Vertical lift is obtained by the rotation of the main rotor assembly thereby forcing air in a downward direction by way of the angle of pitch of the blades. Rotation of the main rotor assembly is achieved using an engine assembly located between the main body of the aircraft and the main rotor assembly, which engine assembly is the main engine assembly forming part of the aircraft, and which main engine assembly is connected to the main body of the aircraft by a tilt enabling joint. The tilt enabling joint consists of numerous components, some of which provide the means to support the main body of the aircraft below the main engine assembly and allow the tilt enabling joint to have a tilting ability while other components provide the means to control and cause tilting motions in the tilt enabling joint during flight, thereby enabling controlled tilting to occur, such that the main engine assembly and the main rotor assembly can be titled together as a unity relative to the main body of the aircraft in a controlled manner during flight, thereby providing a means for controlling the directional travel of the aircraft during flight and changing the aircaft's direction of travel.

During flight, rotational stability of the main body of the aircraft is maintained by means of an additional engine assembly attached to the aircraft which rotates a secondary rotor assembly, thereby pushing air primarily in a horizontal direction to counter the rotational force exerted on the main body of the aircraft by the rotation of the upper main rotor assembly, which said secondary rotor assembly consists of an assembly of blades and a rotor.

The tilt enabling joint is connected to the main body of the aircraft by means that enable the distance between the tilt enabling joint and the main body of the aircraft to be varied.

In one form of the aircraft a plurality tubes are used to connect the tilt enabling joint to the main body of the aircraft. The tubes are of such relative sizes and assembled in such a manner that the tubes are able to function in a telescopic manner between the base of the tilt enabling joint and the main body of the aircraft.

By sealing the telescopic tube assembly to prevent air from entering and exiting the telescopic tube assembly and fitting a valve to the telescopic tube assembly that could allow air to enter and exit the telescopic assembly, the telescopic movement can be controlled.

The body of the aircraft suspended beneath the tilt enabling joint acts on the main rotor in a similar manner to that of a keel on a yaght. The greater the distance that the body of the aircraft is from the main rotor, the more stable the aircraft becomes, and the less sensitive is the aircraft to heavy cargo being stored away from the aircraft's centre of gravity. Hence the aircraft's sensitivity to cargo being stored away from its centre of gravity can be varied by varying the distance between the main body of the aircraft and the main rotor assembly.

DESCRIPTION OF THE PREFERRED EMBODIMENT

Figure 1:
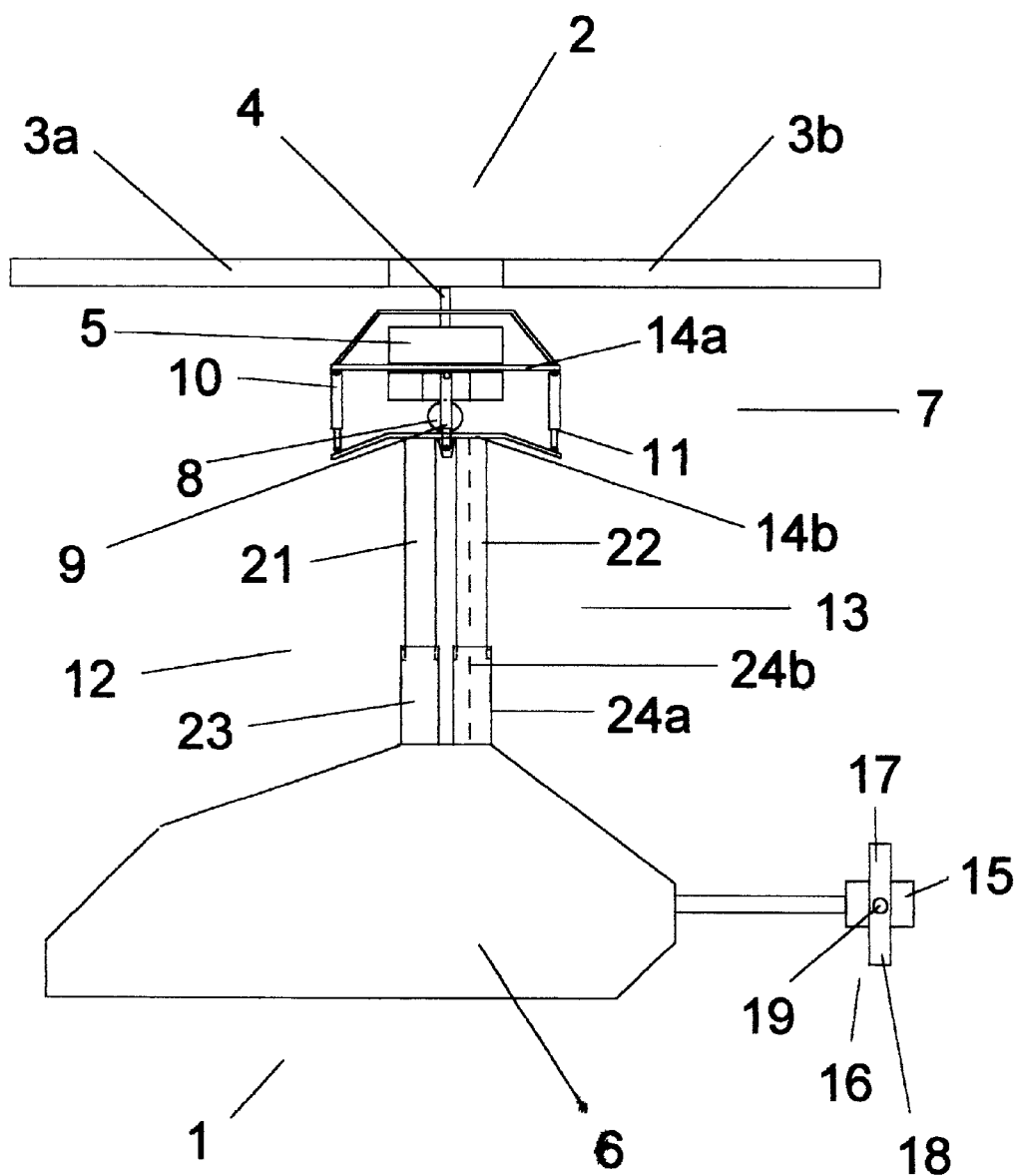
FIG. 1 is a view of the left side of one form of aircraft according to this invention, with multiple seperate telescopic tube assemblies providing the means for varying the distance between the main rotor and the main body of the aircraft.

FIG. 1 shows one form of the vertical take-off aircraft 1 according to this invention. Looking at the vertical take-off aircraft in FIG. 1 it can be seen that the aircraft 1 comprises a main rotor assembly 2 at the top of the aircraft, which main rotor assembly consists of an assembly of blades 3a, 3b and a rotor 4. Rotation of the main rotor assembly is achieved by means of an engine assembly 5, which is the main engine assembly on the aircraft. Vertical lift is achieved by the rotation of the main rotor assembly 2. Rotation of the main rotor assembly 2 forces air in a downward direction by way of the angle of pitch of the blades 3a and 3b. The main engine assembly 5 is connected to the main body 6 of the aircraft by a tilt enabling joint 7. The tilt enabling joint 7 enables tilting of the main engine assembly 5 relative to the main body 6 of the aircraft to occur in a controlled manner. A universal joint 8 is used to allow tilting to occur. The tilt enabling joint 7 is fitted with a combination of hydraulic actuators 9, 10 and 11 that allow the tilting of the tilt enabling joint 7 to be controlled. As hydraulic pressure is applied to the front hydraulic actuator 10, it expands and in so doing tilts the upper section 14a of the tilt enabling joint 7 rearward, while hydraulic acutator 11 contracts. As hydraulic pressure to the front hydraulic actuator 10 is released, and hydraulic pressure is applied to the rear hydraulic actuator 11, the rear hydraulic actuator 11 acts to tilt the upper section 14a of the tilt enabling joint 7 forward. When the main engine assembly 5 is tilted, the main rotor assembly 2 is tilted with the main engine assembly. Tilting of the main engine assembly 5 thus initiates changes in the direction of travel of the aircraft without the need to change the pitch angles of the blades 3a and 3b. To counter the rotational force exerted on the main body 6 of the aircraft by the rotation of the main rotor assembly 2, FIG. 1 shows an additional engine assembly 15 attached to the main body of the aircraft, which rotates a secondary rotor assembly 16. The secondary rotor assembly consists of blades 17 and 18, and a rotor 19. Rotation of the secondary rotor assembly pushes air in a primarily horizontal direction by way of the pitch of the blades 17 and 18. By forcing air to travel in a horizontal direction, the secondary rotor assembly acts to counter the rotational force exerted on the main body 6 of the aircraft by the rotation of the main rotor assembly 2. Two telescopic tube assemblies 12 and 13 connect the base 14b of the tilt enbling joint 7 to the main body 6 of the aircraft, with the telescopic tube assemblies comprising the smaller tubes 21 and 22 which slide into the larger tubes 23 and 24a, respectively, thus providing the means for varying the distance between the main body of the aircraft and the base 14b of the tilt enabling joint 7. To prevent seperation of the smaller tubes from the larger tubes the lower ends of the smaller tubes 21 and 22 are flared outward, while the upper ends of the larger tubes 23 and 24a are bent inward. A cable 24b linking the main body of the aircraft to the base of the tilt enabling joint also prevents the tubes from seperating.

Figure 2:
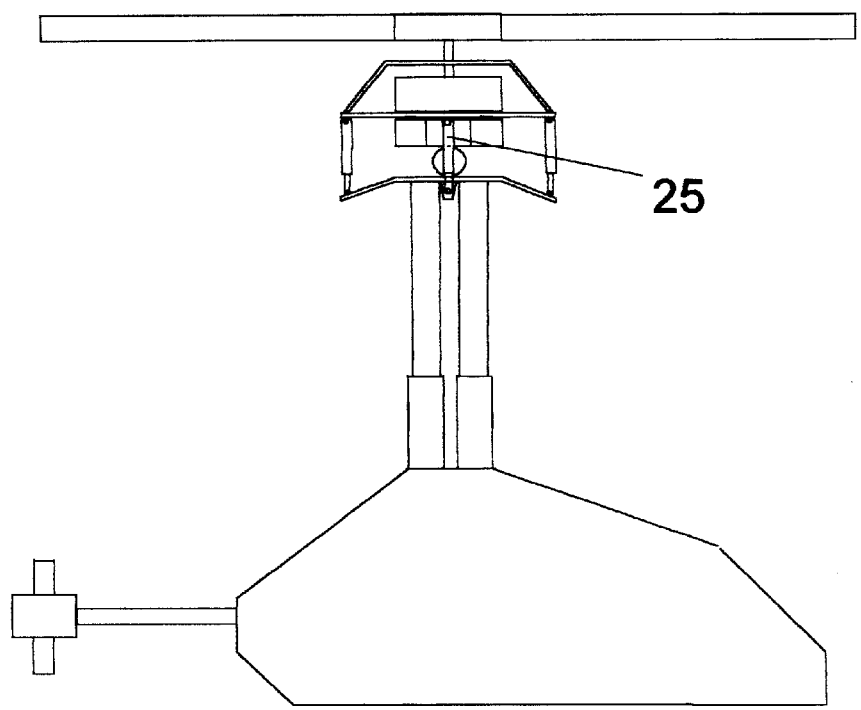
FIG. 2 is a view of the right side of the aircraft of FIG. 1.

FIG. 2 shows the right side of the aircraft of FIG. 1. The hydraulic actuator 25 that is located on the right side of the tilt enabling joint of FIG. 1 can now be seen.

Figure 3:
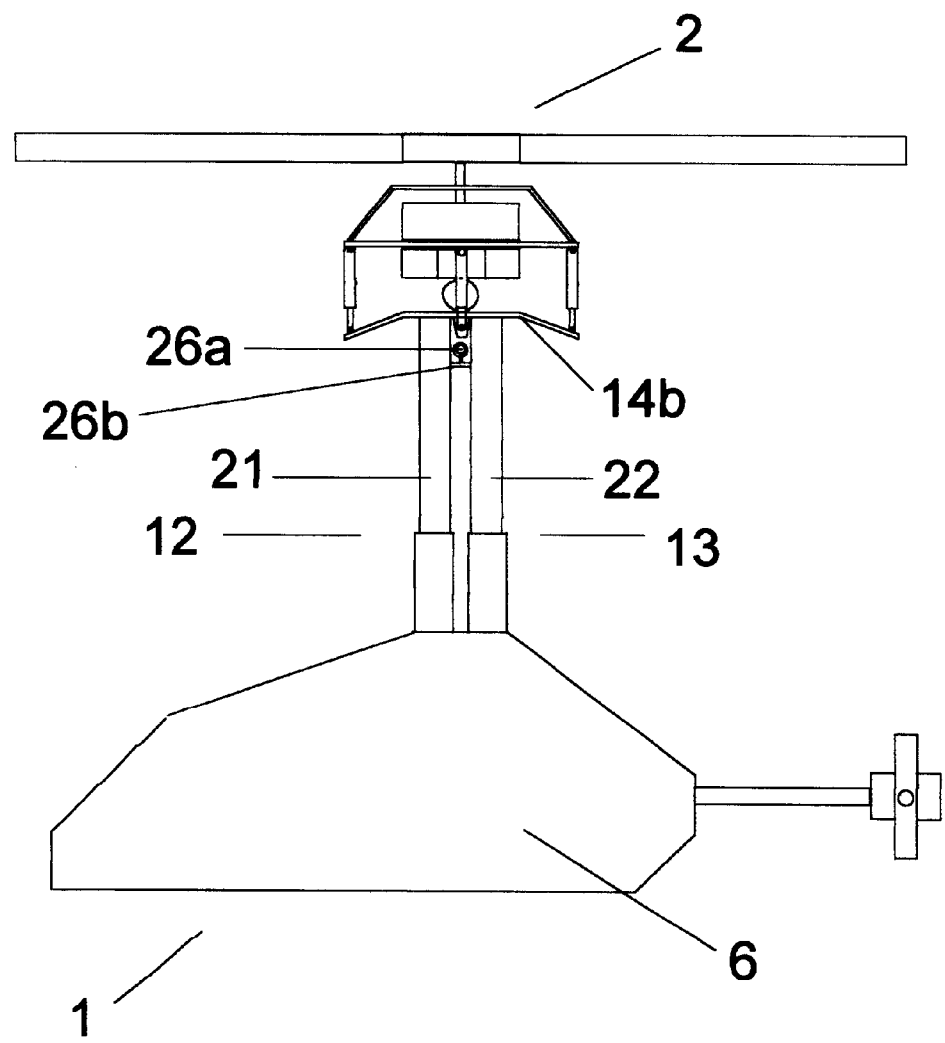
FIG. 3 shows the position of a valve that provides the means to control the movement of the telescopic tube assemblies of FIG. 1.

FIG. 3 shows the aircraft 1 of FIG. 1 with the addition of a valve 26a fitted to the telescopic tubes 21 and 22 by a tube 26b. The tube 26b allows air to enter and exit the telescopic tube assemblies by means of the valve 26a. The valve 26a provides a means for controlling the telescopic movement of the of the telescopic tube assemblies and hence the means for controlling the distance between the base of the tilt enabling joint 14b and the main body 6 of the aircraft. With telescopic tube assemblies 12 and 13 sealed to prevent air from entering or exiting the telescopic tube assemblies 12 and 13 except by means of the valve 26a, the valve can be used to keep the telescopic tube assembly in extended form even when the main rotor assembly 2 ceases to rotate after landing or the valve can be used to allow the main rotor assembly 2 to be lowered for service or storage of the aircraft. With this feature the aircraft could land in a forest and keep the main rotor assembly above trees.

Figure 4:
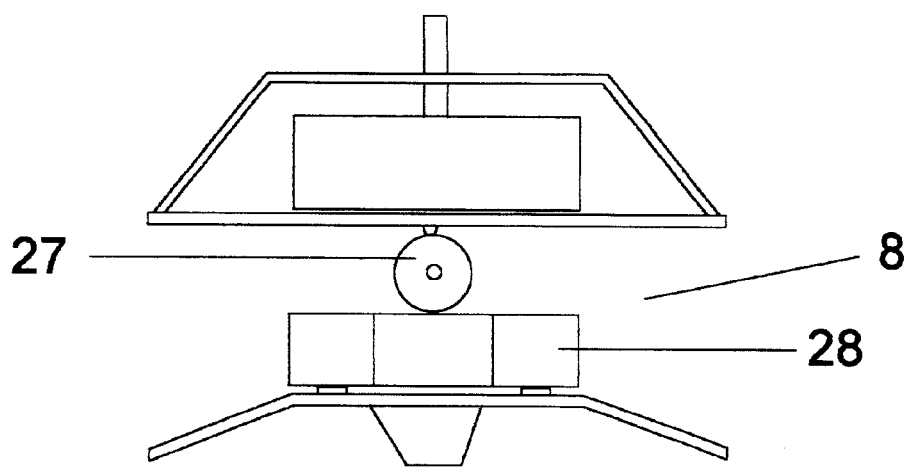
FIG. 4 and FIG. 5 show how the universal joint used in FIG. 1 is composed.
Figure 5:
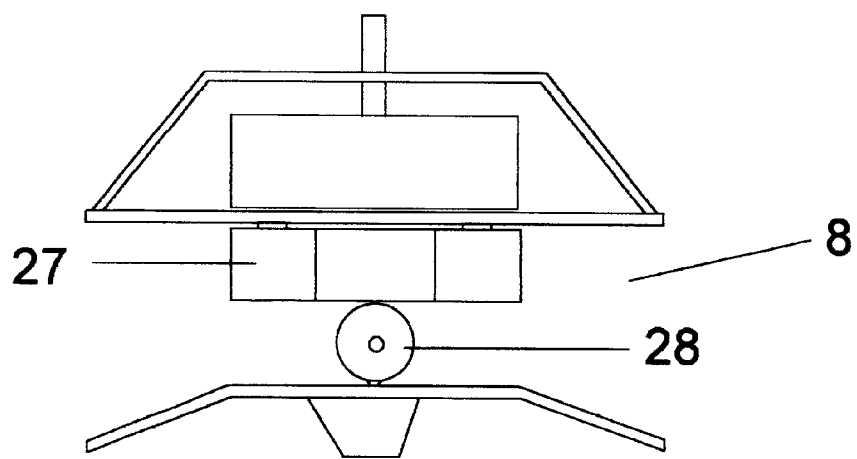

FIG. 4 and FIG. 5 show the universal joint 8 as being formed by means of transversely connected hinges 27 and 28.

Figure 6:
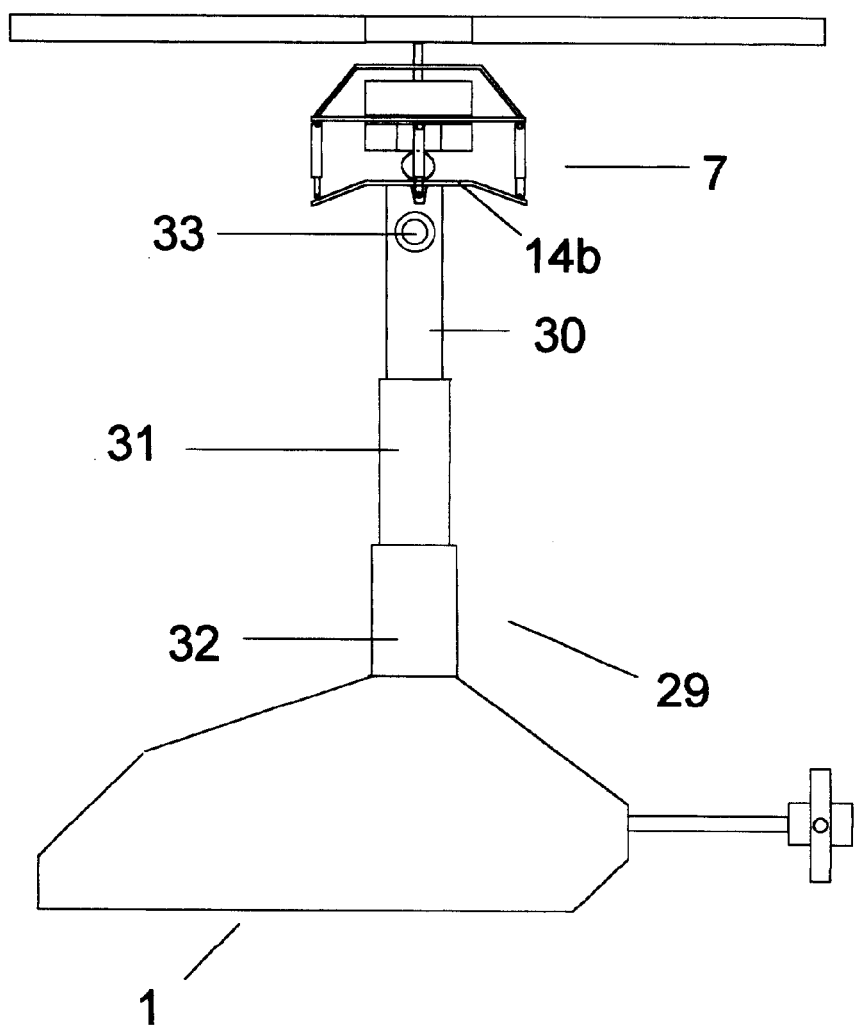
FIG. 6 shows a single telescopic tube assembly providing the means for varying the distance between the main rotor and the main body of the aircraft.
Figure 7:
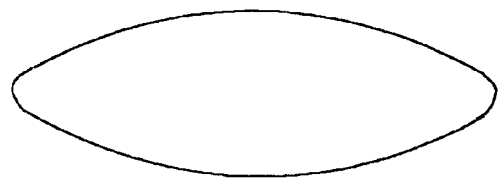
FIG. 7 shows the shape of the tubes in the telescopic tube assembly in FIG. 6.

FIG. 6 shows a version of the aircraft 1 fitted with a single telescopic tube assembly 29 below the base 14b of the tilt enabling joint 7, with the telescopic tube assembly consisting of the small tube 30 which slides in a telescopic manner into the larger tube 31, and with the larger tube 31 being able to slide in a telescopic manner into an even larger tube 32. With the tube assembly 29 sealed to prevent air from entering or exiting the tube assembly, a valve 33 provides a means for controlling the telescopic action of the telescopic tube assembly 29. Rotation of the tubes 30, 31 and 32 with respect to one another is prevented by using tubes that are not perfectly round. FIG. 7 shows the oval shape of the tubes, as the ends of the tubes would appear if the tubes were seperated.

Figure 8:
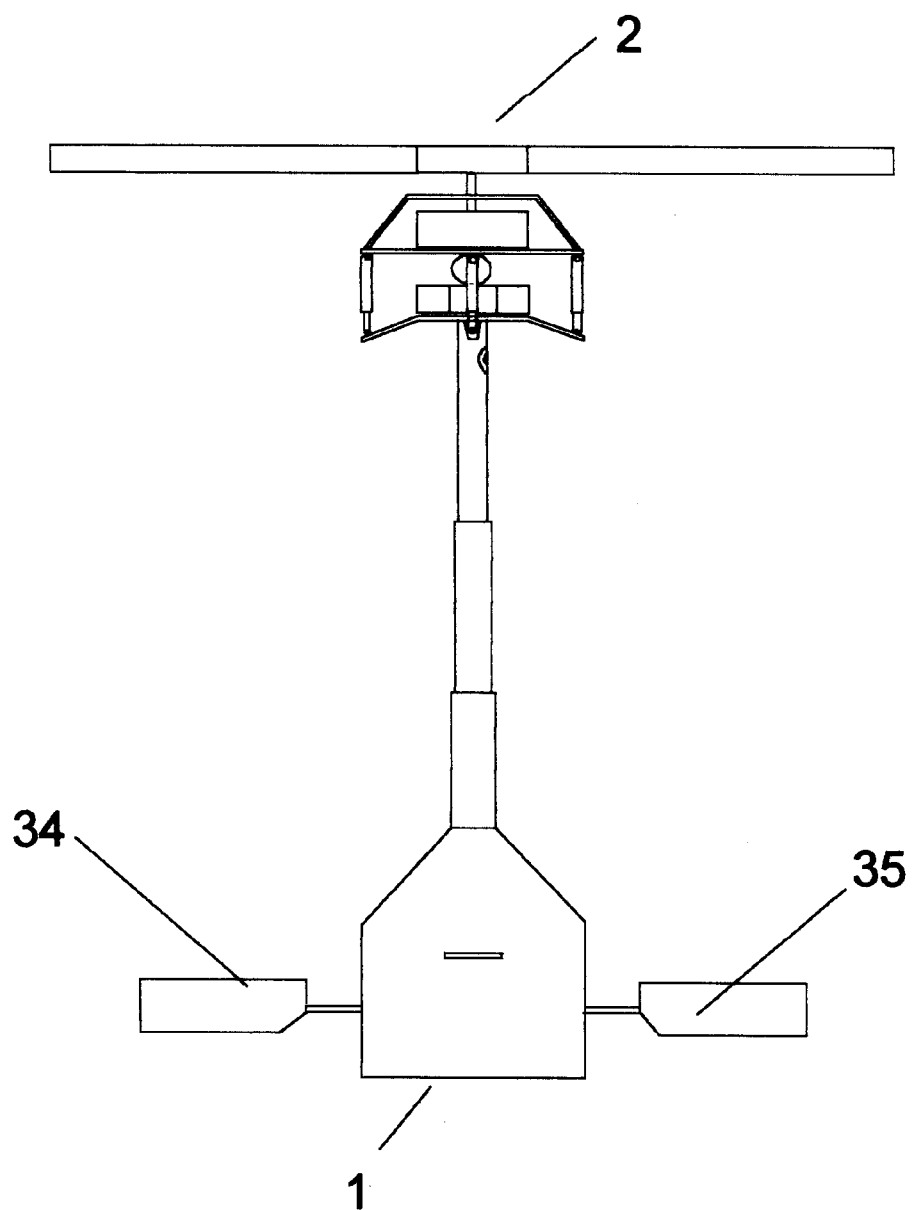
FIG. 8 shows the possible position on the main body of the aircraft for variable pitch fins.

FIG. 8 shows the front of the aircraft 1 of FIG. 6 and how variable pitch fins 34 ad 35 could be positioned on the aircraft. The variable pitch fins could augment control of the aircraft, and could be used as airbrakes. They could also provide lift during high speed forward flight, such as wings on an airplane, since downwash from the main rotor assembly 2 would be directed to the rear of the aircraft, due to the tilting of the main rotor assembly in a forward direction and the distance of the main rotor assembly from the variable pitch fins.

Figure 9:
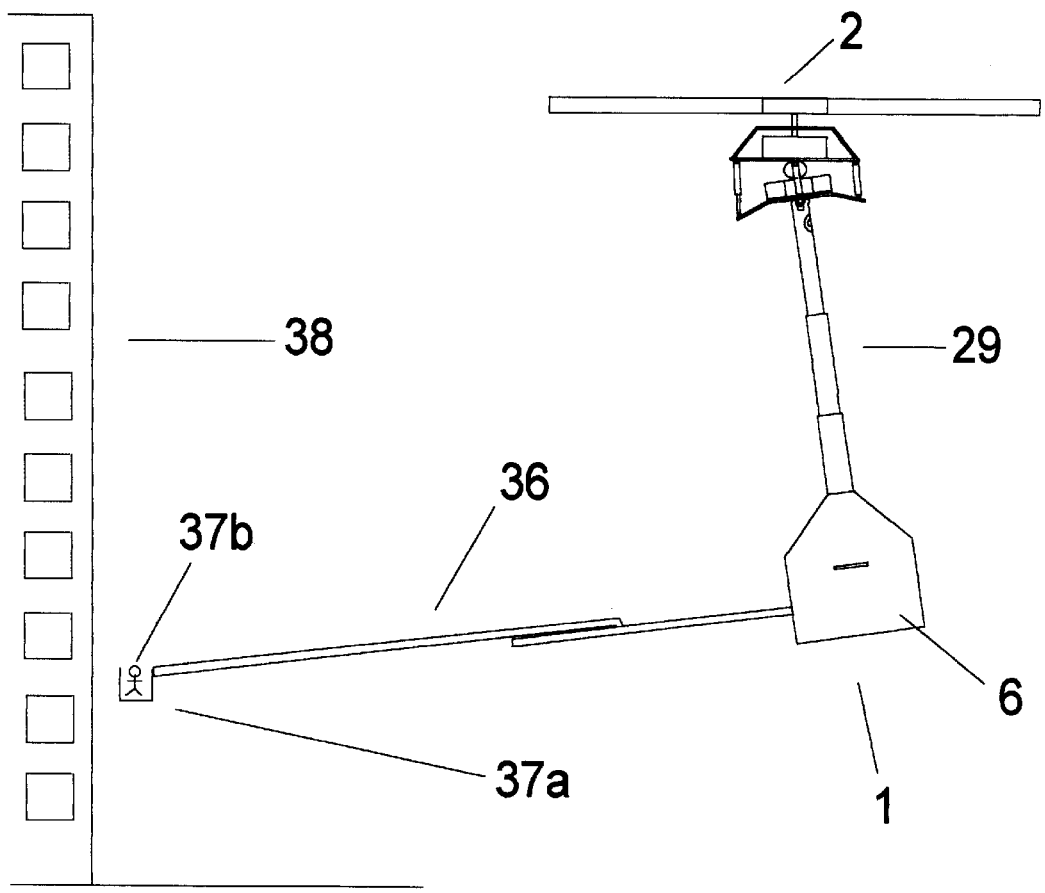
FIG. 9 shows one likely use for the aircraft of FIG. 6, as a life saving vehicle, evacuating a person from the side of a building.

FIG. 9 shows the aircraft 1 of FIG. 6 as it could be used as an evacution vehicle for persons trapped in a building 38. An extension ladder 36 secured to the main body 6 of the aircraft is shown in extended form, with a basket 37a at the end of the extension ladder. FIG. 8 shows how a person 37b could be rescued from the building. The fully extended telescopic tube assembly 29 makes the main body 6 of the aircraft act like a keel on a yaght, so that an extension ladder has a minimal effect on the ability to control the aircraft. The main body could be tilted slightly, while the main rotor assembly 2 could be maintained in a level position. If the telescopic tube assembly 29 was in compressed state the tilting of the main body of the aircraft would be greater.

Figure 10:
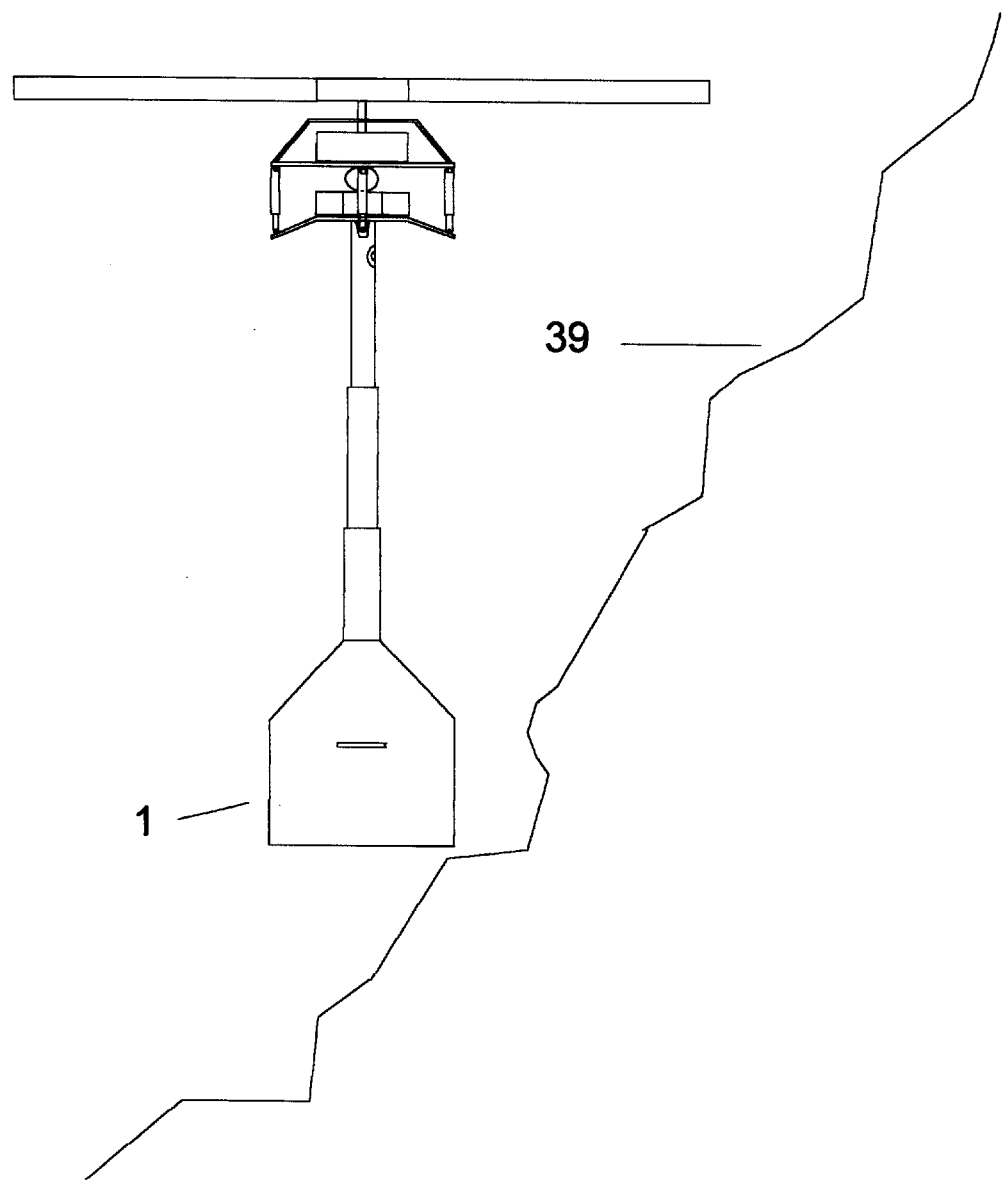
FIG. 10 shows how the main body of the aircraft of FIG. 6 can make contact with the side of a steep mountain while the main rotor blades are kept at a safe distance from the mountain.

FIG. 10 shows how the aircraft 1 of FIG. 6 could be used to quickly unload supplies on the side of a steep mountain 39, or quickly evacuate injured persons without having to use a winch. The relatively short distance between the main rotor and the main body of a conventional helicopter would prevent the main body of a conventional helicopter being able to make contact with such a steep mountain without the rotor blades impacting with the mountain.

Figure 11:
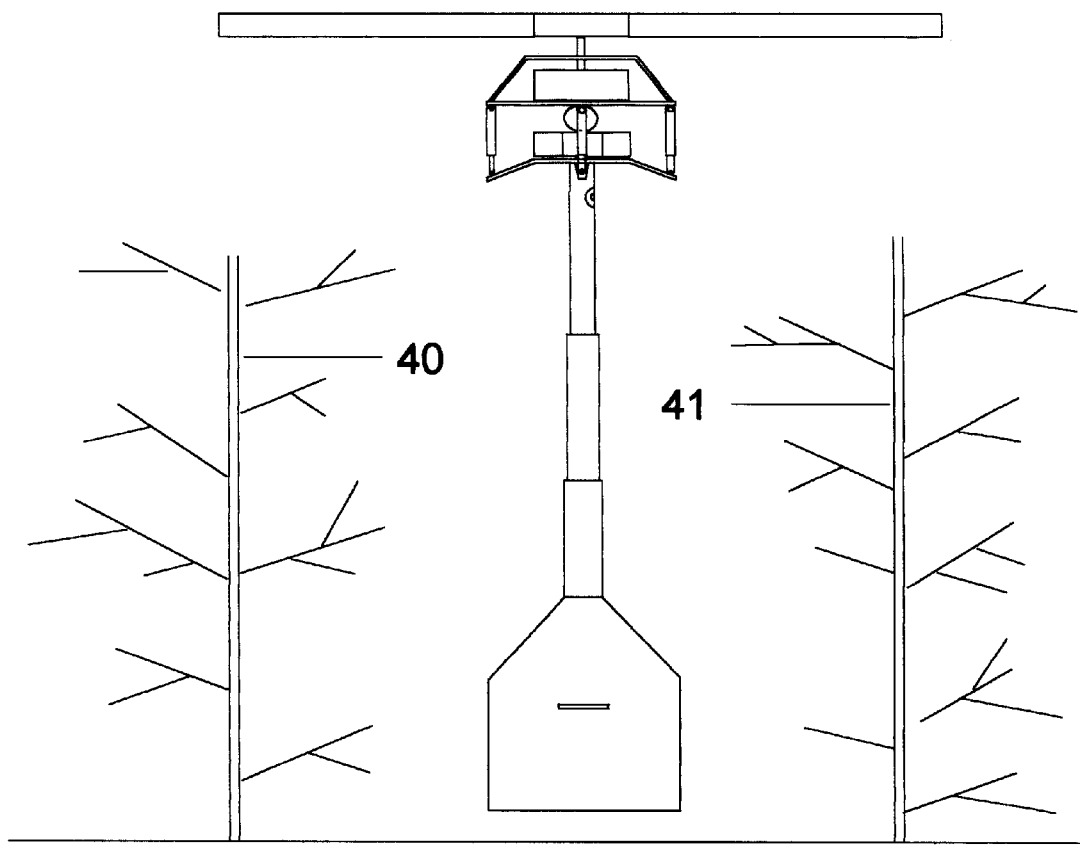
FIG. 11 shows how the aircraft can be landed in a narrow area between trees that is slightly wider than the main body of the aircraft without the blades of the main rotor blade assembly striking the trees.

FIG. 11 shows how the aircraft of FIG. 6 could land between trees 40 and 41, while the main rotor assembly is kept above the tops of the trees. Cargo could be loaded and unloaded or injured persons evacuated without using a winch.

Figure 12:
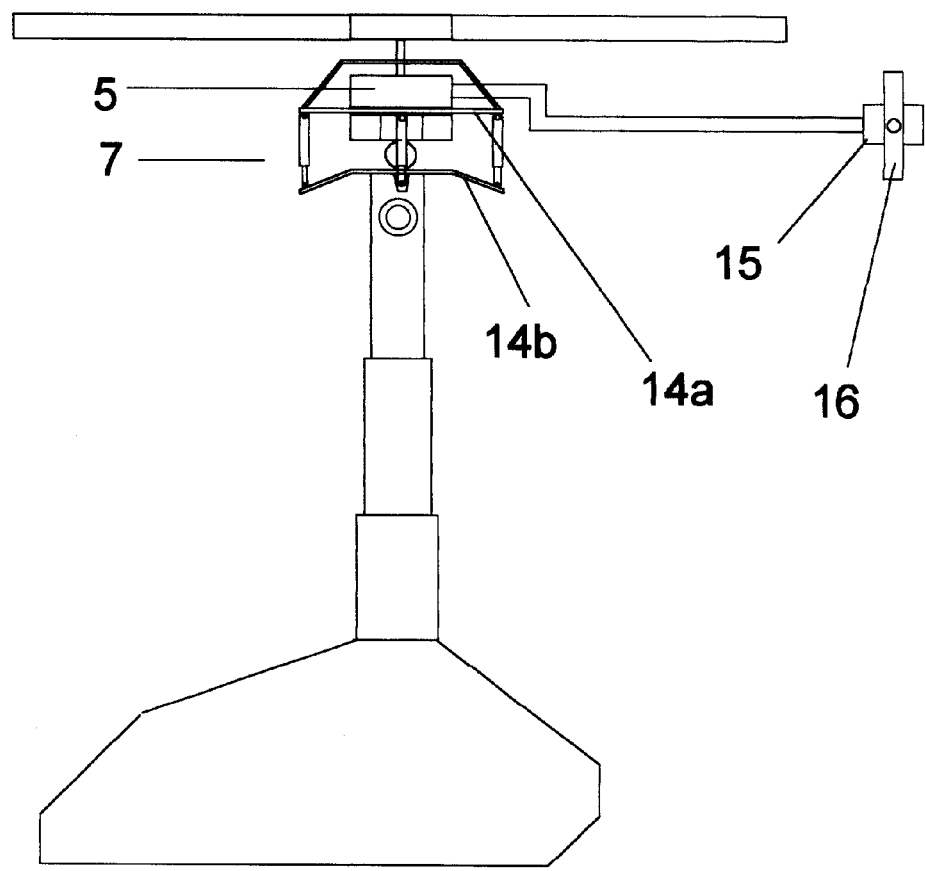
FIG. 12 shows a counter torque rotor connected to the aircraft such that distance between the counter torque rotor and the main body of the aircraft can be varied.

FIG. 12 shows the aircraft of FIG. 6 with the additional engine assembly 15 and the secondary rotor assembly 16 connected to the main engine assembly 5. By attaching the secondary rotor assembly 16 and the additional engine assembly 15 to the main engine assembly, the secondary rotor assembly could be kept above trees when the aircraft is landed amongst trees as shown in FIG. 11. The aircraft could land in an area such as a forest where the rotors of a conventional helicopter would impact with the trees. The aircraft would not require a cleared landing zone to land in a forest. In a war, the possible landing area would be less predictable by an enemy force, reducing the risk of an ambush around a cleared landing zone. If the aircraft was operated on a battle field and the aircraft was target by a heat seaking missile during flight, having the main engine assembly 5 and the additional engine assembly located away from the main body of the aircraft would provide the occupants with a greater chance of survival than if the main engine assembly was attached directly to the main body of the aircraft if the missile caused a fire at the main engine assembly. The additional engine assembly 15 and secondary rotor assembly could also be attached to the base 14b of the tilt enabling joint 7, or the upper section 14a of the tilt enabling joint 7.

Figure 13:
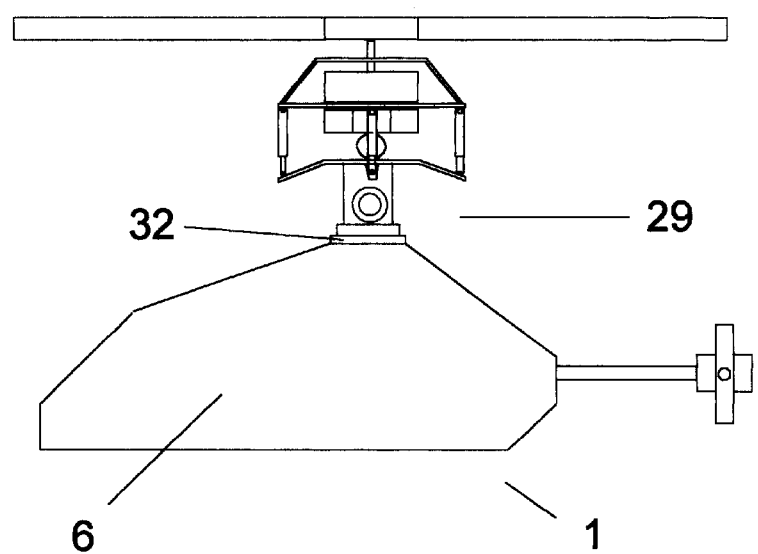
FIG. 13 shows the aircraft of FIG. 6 with the telescopic tube assembly in a compressed stated.

FIG. 13 shows the aircraft 1 of FIG. 6 with the telescopic tube assembly 29 in a compressed state, and with the tube 32 lowered into the main body 6 of the aircraft. In this compressed stated the aircraft is easier to store, particular if it is to be transported by ship, and allows mechanics easier access to the main rotor assembly and the main engine assembly.

By keeping the main engine assembly at a significant distance from the main body of the aircraft, as shown in FIG. 6, noise and vibration inside the main body of the aircraft caused by the main engine assembly and rotation of the main rotor assembly would be lower than if the main engine assembly and main rotor assembly was closer to the main body of the aircraft as shown in FIG. 13.

Figure 14:
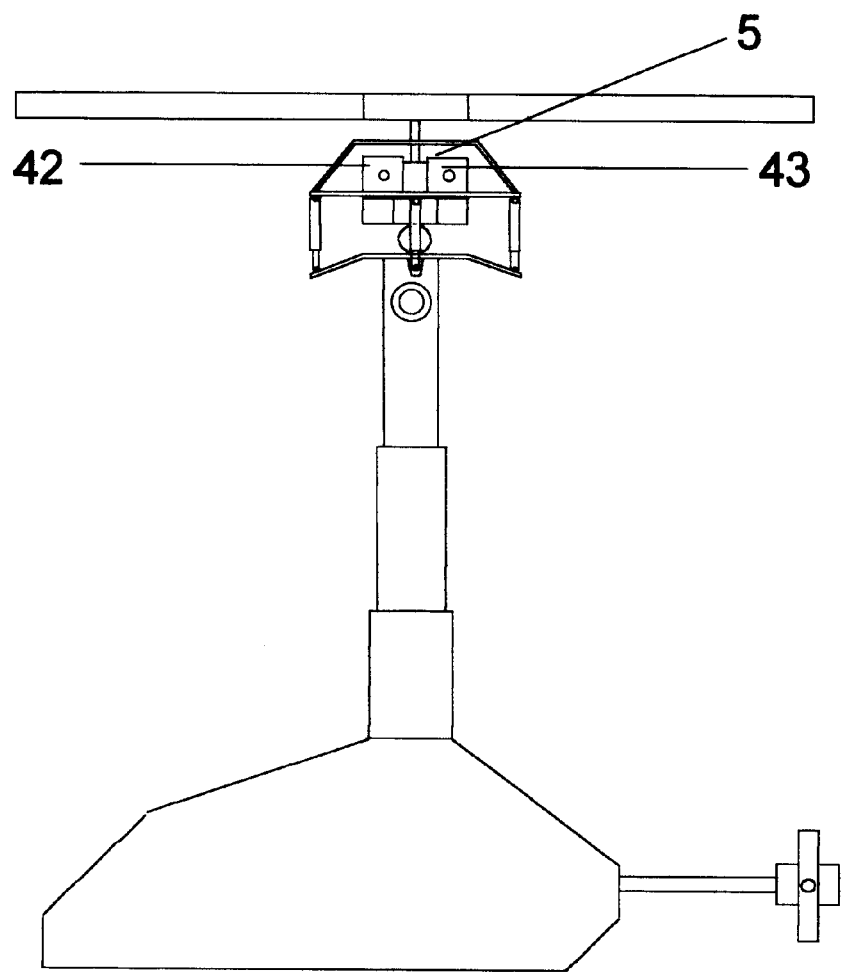
FIG. 14 shows a version of the aircraft of FIG. 6, with the main engine assembly comprising two engines.

FIG. 14 shows a variation of the aircraft of FIG. 6 with the main engine assembly 5 comprising two engines 42 and 43 that are used to rotate the main rotor assembly. In FIG. 6 the main engine assembly comprised a single engine.

Figure 15:
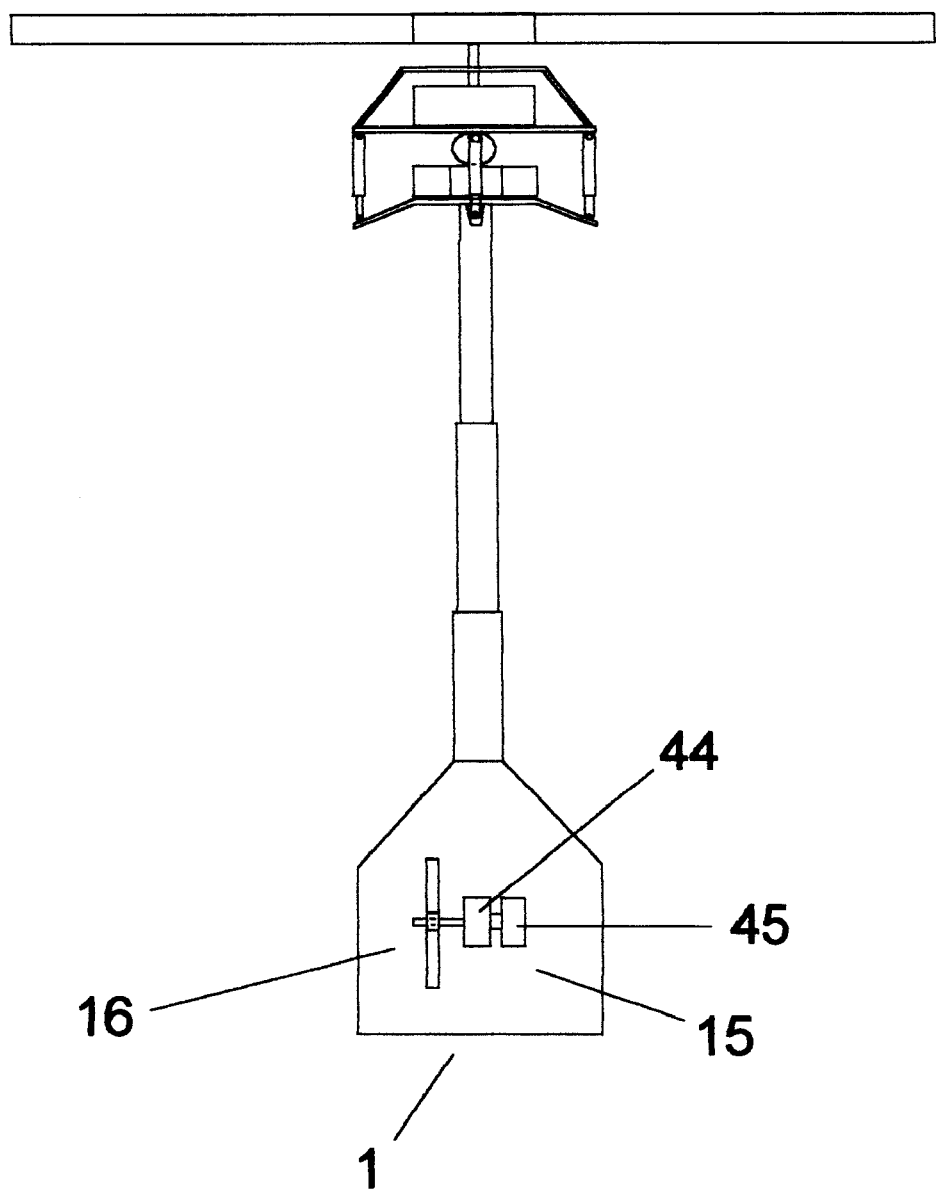
FIG. 15 shows a rear view of a version of the aircraft of FIG. 6 with the additional engine assembly for the counter torque rotor comprising two engines.

FIG. 15 shows the rear of a variation of the aircraft 1 of FIG. 6 with the additional engine assembly 15 comprising two engines 44 and 45 that are used to rotate the secondary rotor assembly 16.

In FIGS. 1 and 6 the additional engine assembly comprised a single engine.

In FIG. 14, the additional engine assembly consists of a single engine.

In a variation of the aircraft of FIG. 14, the the additional engine assembly consists of two engines and the main engine assembly consists of two engines.

Figure 16:
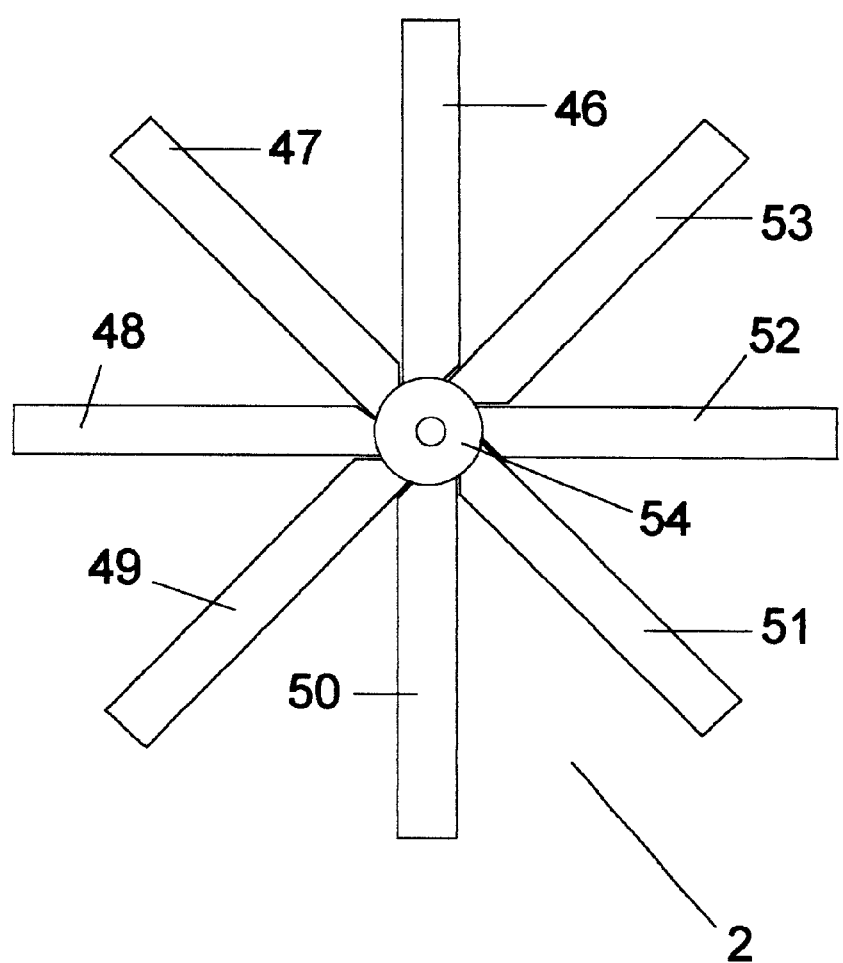
FIG. 16 shows how eight rotor blades can be assembled around a rotor when space for blade pitch varying components is not required.

FIG. 16 shows how eight rotor blades 46, 47, 48, 49, 50, 51, 52, 53, can be assembled around a rotor 54 when space is not required for blade pitch varying components. This number of rotor blades would allow the rotor assembly 2 to be rotated at a lower rate of revolution than a rotor assembly with fewer blades, to achieve the same lifting ability, resulting in a relatively quieter aircraft. Having a high number of rotor blades would help the aircraft to operate in high altitude mountainous regions or hot regions, where the air is thin.

The claims defining this invention are as follows:

1. A vertical take-off aircraft, comprising a main rotor assembly, at the top of the aircraft, which said main rotor assembly is comprised of an assembly of blades and a rotor, and such that the said main rotor assembly is above the main body of the aircraft, with vertical lift being achieved by an engine assembly rotating the main rotor assembly thereby forcing air in a downward direction by way of the blades in the main rotor assembly, which engine assembly is the main engine assembly of the aircraft, and which said main engine assembly is connected to the main body of the aircraft by a tilt enabling joint, such that the main rotor assembly and main engine assembly can be tilted together as a unity in a plurality of directions and angles relative to the main body of the aircraft, in a controlled manner, such that the direction of travel of the aircraft can be altered by altering the direction or angle of tilt of the main engine assembly relative to the main body of the aircraft, and which said tilt enabling joint is connected to the main body of the aircraft such that the distance between the main body of the aircraft and the base of the tilt enabling joint can be varied, with a secondary rotor assembly, consisting of an assembly of blades and a rotor, connected to the aircraft, which said secondary rotor assembly is used to force air to travel in a horizontal direction, for which said secondary rotor assembly rotation is achieved by means of an additional engine assembly, such that by forcing air to travel in a horizontal direction, relative to the main body of the aircraft, the rotational force exerted on the main body of the aircraft by the rotation of the main rotor assembly can be countered.

2. The vertical take-off aircraft of claim 1 wherein the distance between the base of the tilt enabling joint and the main body of the aircraft is able to be varied by a tube being able to slide vertically inward and outward of a tube of relatively larger width, in a telescopic manner, so as to form a telescopic tube assembly, with the tubes positioned on the aircraft such that the sliding movement is able to occur between the main body of the aircraft and the tilt enabling joint.

3. The vertical take-off aircraft of claim 2 wherein a valve is connected to the assembly of telescopic sliding tubes such that by closing the valve the telescopic sliding movement can be restricted.

4. The vertical take-off aircraft of claim 1 wherein the distance between the base of the tilt enabling joint and the main body of the aircraft is able to be varied by tubes being able to slide vertically inward and outward of tubes of relatively larger widths, in a telescopic manner, with the tube assemblies positioned on the aircraft such that telescopic sliding movement is able to occur between the main body of the aircraft and the tilt enabling joint.

5. The vertical take-off aircraft of claim 4 wherein a valve is connected to the telescopic sliding tube assemblies such that by closing the valve the telescopic sliding movement can be restricted.

6. The vertical take-off aircraft of claim 1 wherein the tilting ability of the said tilt enabling joint is achieved by means of universal joint situated between the main engine assembly and the main body of the aircraft.

7. The vertical take-off aircraft of the claim 1 wherein the main engine assembly consists of a single engine.

8. The vertical take-off aircraft of the claim 1 wherein the main engine assembly consists of a plurality of engines.

9. The vertical take-off aircraft of the claim 1 wherein the additional engine assembly attached to the aircraft which rotates the secondary rotor assembly that is used to force air to travel in a horizontal direction consists of a single engine.

10. The vertical take-off aircraft of the claim 1 wherein the additional engine assembly attached to the aircraft which rotates the secondary rotor assembly that is used to force air to travel in a horizontal direction consists of a plurality of engines.

11. The vertical take-off aircraft of the claim 7 wherein the additional engine assembly attached to the aircraft which rotates the secondary rotor assembly that is used to force air to travel in a horizontal direction consists of a single engine.

12. The vertical take-off aircraft of the claim 7 wherein the additional engine assembly attached to the aircraft which rotates the secondary rotor assembly that is used to force air to travel in a horizontal direction consists of a plurality of engines.

13. The vertical take-off aircraft of the claim 8 wherein the additional engine assembly attached to the aircraft which rotates the secondary rotor assembly that is used to force air to travel in a horizontal direction consists of a single engine.

14. The vertical take-off aircraft of the claim 8 wherein the additional engine assembly attached to the aircraft which rotates the secondary rotor assembly that is used to force air to travel in a horizontal direction consists of a plurality of engines.

15. The vertical take-off aircraft of the claim 2 wherein the main engine assembly consists of a single engine.

16. The vertical take-off aircraft of the claim 2 wherein the main engine assembly consists of a plurality of engines.

17. The vertical take-off aircraft of the claim 15 wherein the additional engine assembly attached to the aircraft which rotates the secondary rotor assembly that is used to force air to travel in a horizontal direction consists of a single engine.

18. The vertical take-off aircraft of the claim 15 wherein the additional engine assembly attached to the aircraft which rotates the secondary rotor assembly that is used to force air to travel in a horizontal direction consists of a plurality of engines.

19. The vertical take-off aircraft of the claim 16 wherein the additional engine assembly attached to the aircraft which rotates the secondary rotor assembly that is used to force air to travel in a horizontal direction consists of a single engine.

20. The vertical take-off aircraft of the claim 16 wherein the additional engine assembly attached to the aircraft which rotates the secondary rotor assembly that is used to force air to travel in a horizontal direction consists of a plurality of engines.

21. A vertical take-off aircraft of claim 1 wherein the said additional engine assembly which rotates the said secondary rotor assembly which is used to force air to travel in a horizontal direction is attached to the said main engine assembly.

22. A vertical take-off aircraft of claim 1 wherein the said additional engine assembly which rotates the said secondary rotor assembly which is used to force air to travel in a horizontal direction is attached to the main body of the aircraft.

23. A vertical take-off aircraft of claim 1 wherein the said additional engine assembly which rotates the said secondary rotor assembly which is used to force air to travel in a horizontal direction is attached to the base of the said tilt enabling joint.

* * * * *